United States Patent [19]
Blufordcraving

[11] Patent Number: 5,755,160
[45] Date of Patent: May 26, 1998

[54] ROTATING FLOOR FOR MOTOR VEHICLES

[76] Inventor: Charles Nathaniel Blufordcraving, 5412 Carden Way, Carmichael, Calif. 95608

[21] Appl. No.: 487,961

[22] Filed: Jun. 7, 1995

Related U.S. Application Data

[63] Continuation of Ser. No. 278,641, Jul. 21, 1994, abandoned.

[51] Int. Cl.⁶ ............................................. B60S 13/02
[52] U.S. Cl. ................... 104/36; 104/44; 104/46; 52/65
[58] Field of Search ................ 104/35, 36, 37, 104/38, 39, 40, 41, 42, 43, 44, 45, 46, 47; 105/28; 52/65; 404/9; 280/87.042

[56] References Cited

U.S. PATENT DOCUMENTS

| | | | |
|---|---|---|---|
| 227,795 | 5/1880 | Kramer | 104/45 X |
| 1,699,463 | 1/1929 | Cresci | 104/38 X |
| 1,804,363 | 5/1931 | Mayden | 104/44 |
| 2,044,031 | 6/1936 | Van Nieuwland | 104/44 |
| 2,677,859 | 5/1954 | McNew | 104/44 X |
| 3,079,871 | 3/1963 | Brodie | 104/44 |
| 3,546,400 | 12/1970 | Dechantsreiter | 191/12 |
| 3,566,798 | 3/1971 | Peitzman | 104/44 |
| 3,566,799 | 3/1971 | Stern | 104/44 |
| 3,599,378 | 8/1971 | Kachnic | 52/29 |
| 3,636,975 | 1/1972 | Kirkman et al. | 137/580 |
| 3,670,464 | 6/1972 | Cutter | 52/30 |
| 3,736,707 | 6/1973 | Neufeld | 52/65 |
| 3,766,664 | 10/1973 | Burgin | 34/182 |
| 3,804,111 | 4/1974 | Chatard et al. | 137/355.16 |
| 3,815,298 | 6/1974 | Pope | 52/65 |
| 3,827,199 | 8/1974 | Tax | 52/10 |
| 3,855,755 | 12/1974 | Burdick | 52/65 |
| 3,873,085 | 3/1975 | Nakamura | 272/2 |
| 3,941,146 | 3/1976 | Chatard et al. | 137/355.16 |
| 4,019,292 | 4/1977 | Pedro | 52/65 |
| 4,020,767 | 5/1977 | Hardy | 104/35 |
| 4,026,076 | 5/1977 | Analetto | 52/6 |
| 4,040,411 | 8/1977 | Rust | 126/271 |
| 4,065,891 | 1/1978 | Burgin | 52/65 |
| 4,094,252 | 6/1978 | Peter et al. | 104/38 X |
| 4,156,994 | 6/1979 | Steuer et al. | 52/65 |
| 4,172,422 | 10/1979 | McBride | 104/44 |
| 4,270,764 | 6/1981 | Yamada | 280/87.042 |
| 4,280,280 | 7/1981 | Eck et al. | 33/203.12 |
| 4,298,307 | 11/1981 | Bergman | 414/676 |
| 4,391,425 | 7/1983 | Keep, Jr. | 246/428 |
| 4,429,636 | 2/1984 | Ziegenfus | 104/36 |
| 4,494,645 | 1/1985 | Hessling et al. | 198/414 |

(List continued on next page.)

FOREIGN PATENT DOCUMENTS 2243636  11/1991  United Kingdom ............ 404/9

OTHER PUBLICATIONS

Bearings, Inc. Product Catalog (undated), pp. 275, PT-53, PT-54 and PT-55.

*Primary Examiner*—S. Joseph Morano
*Attorney, Agent, or Firm*—Bernhard Kreten

[57]  ABSTRACT

A rotating floor is provided for rotating a motor vehicle so that the motor vehicle attains a new heading. The rotating floor includes a platform supporting the motor vehicle. The platform is supported above-ground by a plurality of wheels oriented in concentric circles which run along races oriented in concentric circles. A motor is provided with an output shaft coaxial with a rotational center point of the platform. The motor is connected to the platform in a direct drive relationship. A chamber is oriented beneath the platform and housing the motor. The chamber can be accessed through a manhole in the platform and is sized sufficiently to allow a person to enter therein for maintenance to the motor. A tunnel is provided extending from the chamber which provides a person with access to a bottom of the platform. Lights are provided on a top of the platform and sensors are provided adjacent the platform which assist a user in positioning the motor vehicle upon the platform for safe rotation of the motor vehicle. A weighing system is incorporated into the races to measure a weight of the motor vehicle upon the platform.

19 Claims, 4 Drawing Sheets

U.S. PATENT DOCUMENTS

| | | | |
|---|---|---|---|
| 4,498,398 | 2/1985 | Vallee | 104/44 |
| 4,562,774 | 1/1986 | Dehring | 104/42 |
| 4,597,334 | 7/1986 | Jacoby | 104/37 |
| 4,608,929 | 9/1986 | Park | 104/44 |
| 4,609,111 | 9/1986 | Astill | 211/1.5 |
| 4,644,707 | 2/1987 | Auborg et al. | 52/65 |
| 4,676,171 | 6/1987 | Kelderman | 104/45 |
| 4,716,837 | 1/1988 | Valencia | 104/38 |
| 4,724,645 | 2/1988 | Pigout | 52/65 |
| 4,750,428 | 6/1988 | Hyte et al. | 104/40 |
| 4,753,173 | 6/1988 | James | 104/45 |
| 4,777,884 | 10/1988 | Seay, Jr. | 104/42 |
| 4,796,537 | 1/1989 | Besser | 104/37 |
| 4,817,345 | 4/1989 | McGlew | 52/36 |
| 4,824,139 | 4/1989 | Robbins | 280/87.042 |
| 4,841,870 | 6/1989 | Coles | 104/44 |
| 4,868,936 | 9/1989 | Crocoli | 4/663 |
| 4,969,300 | 11/1990 | Pope | 52/65 |
| 5,012,745 | 5/1991 | Yamashita | 104/44 |
| 5,086,704 | 2/1992 | Mueller | 104/44 |
| 5,094,048 | 3/1992 | Woo | 52/143 |
| 5,113,974 | 5/1992 | Vayda | 186/36 |
| 5,148,752 | 9/1992 | Yamashita | 104/44 |
| 5,522,620 | 6/1996 | Pracas | 280/87.042 |

ROTATING FLOOR FOR MOTOR VEHICLES

CROSS REFERENCE TO A RELATED APPLICATION

This application is a continuation of application Ser. No. 08/278,641, filed Jul. 21, 1994, now abandoned.

FIELD OF THE INVENTION

This invention relates to turntables for the rotation of automobiles and other motor vehicles. More specifically, this invention relates to turntables which are powered by a motor which directly drives the turntable and which align and weigh the vehicle placed thereon.

BACKGROUND OF THE INVENTION

Turntables are well known in the art which provide for rotation of automobiles and other vehicles in spaces too confined for the motor vehicle to be effectively turned with the steering system provided by the vehicle. These prior art turntables generally provide some form of platform or top plate which is flush with a surrounding surface and is circular with a pivot point at a center thereof. The top plate is suspended above the ground and coupled to some form of rotational motor through gearing systems.

The prior art turntables suffer from a number of drawbacks. The weight of cars involved and the typical operating environment for the turntable in an exterior or carport-type environment, causes these turntables to occasionally suffer breakdowns through excessive wear. Environmental problems such as flooding of systems underneath the top plate and large temperature fluctuations also reduce reliability. While designing to withstand these environmental hazards is possible, it is often only partially successfully. Also, over time, wear of the motor and gear drive systems occurs, also as the suspensions for the top plate exhibit wear. With the prior art turntables, maintenance of the various subsystems of these turntables is rather complicated, often requiring removal of the top plate which is typically of great mass to effectively support a motor vehicle thereon. Also, these prior art systems are not altogether successful in effectively assisting a driver in aligning the vehicle upon the turntable for effective operation of the turntable. Many of these prior art turntables require precise alignment of the motor vehicle thereon to prevent damage to the turntable during operation and jamming of the turntable.

The invention of this application overcomes many of the deficiencies of the prior art by providing a turntable which is of durable construction and additionally provides for easy access to the various systems of the invention for maintenance and repair thereof.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| 3,546,400 | December 8, 1970 | Dechantsreiter |
| 3,566,798 | March 2, 1971 | Peitzman |
| 3,566,799 | March 2, 1971 | Stern |
| 3,599,378 | August 17, 1971 | Kachnic |
| 3,636,975 | January 25, 1972 | Kirkman, et al. |
| 3,670,464 | June 20, 1972 | Cutter |
| 3,736,707 | June 5, 1973 | Neufeld |
| 3,766,664 | October 23, 1973 | Burgin |
| 3,804,111 | April 16, 1974 | Chatard, et al. |
| 3,815,298 | June 11, 1974 | Pope |
| 3,827,199 | August 6, 1974 | Tax |
| 3,855,755 | December 24, 1974 | Burdick |
| 3,873,085 | March 25, 1975 | Nakamura |
| 3,941,146 | March 2, 1976 | Chatard, et al. |
| 4,019,292 | April 26, 1977 | Pedro |
| 4,020,767 | May 3, 1977 | Hardy |
| 4,026,076 | May 31, 1977 | Analetto |
| 4,040,411 | August 9, 1977 | Rust |
| 4,065,891 | January 3, 1978 | Burgin |
| 4,156,994 | June 5, 1979 | Steuer, et al. |
| 4,172,422 | October 30, 1979 | McBride |
| 4,280,280 | July 28, 1981 | Eck, et al. |
| 4,298,307 | November 3, 1981 | Bergman |
| 4,391,425 | July 5, 1983 | Keep, Jr. |
| 4,429,636 | February 7, 1984 | Ziegenfus |
| 4,494,645 | January 22, 1985 | Hessling, et al. |
| 4,498,398 | February 12, 1985 | Vallee |
| 4,597,334 | July 1, 1986 | Jacoby |
| 4,562,774 | January 7, 1986 | Dehring |
| 4,608,929 | September 2, 1986 | Park |
| 4,609,111 | September 2, 1986 | Astill |
| 4,644,707 | February 24, 1987 | Aubourg, et al. |
| 4,676,171 | June 30, 1987 | Kelderman |
| 4,724,645 | February 16, 1988 | Pigout |
| 4,750,428 | June 14, 1988 | Hyte, et al. |
| 4,753,173 | June 28, 1988 | James |
| 4,777,884 | October 18, 1988 | Seay, Jr. |
| 4,716,837 | January 5, 1988 | Valencia |
| 4,796,537 | January 10, 1989 | Besser |
| 4,817,345 | April 4, 1989 | McGlew |
| 4,841,870 | June 27, 1989 | Coles |
| 4,868,936 | September 26, 1989 | Crocoli |
| 4,969,300 | November 13, 1990 | Pope |
| 5,012,745 | May 7, 1991 | Yamashita |
| 5,086,704 | February 11, 1992 | Mueller |
| 5,094,048 | March 10, 1992 | Woo |
| 5,113,974 | May 19, 1992 | Vayda |
| 5,148,752 | September 22, 1992 | Yamashita |

OTHER PRIOR ART (Including Author, Title, Date, Pertinent Pages, Etc.)

Bearings, Inc. Product Catalog   Pages 275, PT-53, PT-54 and PT-55 (undated)

The patent to McBride teaches the use of a turntable for automobiles that includes a turntable nested parallel to a surrounding surface, suspended upon wheels and including a drain therebeneath. The invention of this application is distinguishable from McBride in that the motor of this invention is in a "direct drive" orientation with respect to the center of rotation of the platform, a manhole is provided and a chamber sufficiently sized to access structures beneath the platform and a weighing system is provided to indicate a weight of the motor vehicle placed upon the platform.

The patent to Park teaches the use of an automobile parking and storage system which provides an upper plate capable of supporting a vehicle thereon, the upper plate driven by a motor through a gear system and nested flush with a surrounding surface. The invention of this application is distinguishable from Park in that access is provided to structures underneath the turntable, a weighing system is supplied, and means is provided for properly aligning the motor vehicle upon the platform.

The patent to Hyte teaches the use of a floating turntable for vehicles which includes a table supporting a vehicle thereon over a casing floor supporting liquid therein. A motor is spaced off to the side of the table and drives the table through a friction drivewheel. The invention of this application is distinguishable from Hyte in that it drives the platform through a direct drive motor and provides access for maintenance below the table.

The patent to Peitzman teaches the use of an automobile turntable including a platform supported upon ballbearings and driven by a motor and gear combination therebeneath. Wheels are also provided for support of the platform. The invention of this application is distinguishable from Peitzman in that a direct drive motor arrangement is utilized to rotate the platform. A manhole is provided for access beneath the platform, a weighing system is provided for weighing of motor vehicle placed upon the platform and means is provided for alignment of the motor vehicle properly upon the platform.

The remainder of the prior art listed above but not specifically distinguished diverge even more starkly from this invention than the patents specifically discussed above.

SUMMARY OF THE INVENTION

The rotating floor for motor vehicles includes a platform for supporting the motor vehicles thereon. The platform is a circular rigid construct substantially coplanar with a surrounding surface. The platform is supported near a periphery thereof by a plurality of outer wheels. The outer wheels are arranged to roll upon an outer race which is substantially circular and parallel to the platform. Inner wheels 70 are connected to a bottom of a platform between the outer wheels and the center point of the platform. The inner wheels are supported by an inner race which is substantially circular and concentric with the outer race.

A plurality of side wheels are connected to the platform near a periphery thereof and oriented to roll along a cylindrical side surface perpendicular to the platform and having a diameter slightly greater than the periphery of the platform.

A drive system is located beneath the platform. The drive system includes a motor with an output shaft coupled to the platform at the center point. The motor is connected to the platform in a "direct drive" relationship without gears interposed therebetween. A tower surrounds the motor and includes a plateau at a top surface thereof. A drive shaft extends upward from the motor, through the plateau and into contact with the platform. The plateau provides a horizontal surface which acts as a race for a platform bearing extending down from the platform near the center point with balls interposed between the platform bearings and the plateau.

A manhole is provided in the platform and the drive system is housed within a chamber sufficiently large to allow a person to pass through the manhole and perform maintenance on the drive system. Also, a tunnel is provided extending away from the chamber to a location adjacent the periphery of the platform and therebelow. The tunnel provides access to the inner wheels, outer wheels, side wheel and other structures beneath the platform.

Guide lights are provided on a top of the platform which form a lane of proper alignment for the motor vehicle. Sensors are provided on a vertical wall adjacent the platform which detect whether the vehicle is properly aligned and can disable the drive system.

When a user intends to use the rotational floor, the user drives a motor vehicle onto the platform and between the guide lights. The motor is then activated causing the platform to rotate upon the outer wheels, inner wheels and platform bearing. Alignment of the platform is maintained by the side wheels.

OBJECTS OF THE INVENTION

Accordingly, it is a primary object of the present invention to provide a rotating floor for a motor vehicle which allows a motor vehicle to be rotated within a confined space.

Another object of the present invention is to provide a rotating floor for a motor vehicle which is of durable construction.

Another further object of the present invention is to provide a device for rotating a motor vehicle which is easily maintained in working order.

Another object of the present invention is to provide a system for rotating a motor vehicle which can detect a weight of a motor vehicle placed thereon.

Another object of the present invention is to provide a rotating floor which can be safely operated without damaging a motor vehicle, the rotating floor or structures adjacent the rotating floor.

Viewed from a first vantage point, it is an object of the present invention to provide a device for rotating a motor vehicle supported thereon, comprised of a platform having a rotational center point, a motor having a rotational output shaft, and a drive shaft, said drive shaft directly coupled to said output shaft and said rotational center point of said platform along the line co-axial with said output shaft and said rotational center point, whereby said platform is directly driven by said motor.

Viewed from a second vantage point, it is an object of the present invention to provide a motor vehicle housing structure comprised of a horizontal surface, walls surrounding and extending upward from said surface, a platform having a top sized to support a motor vehicle thereon, said platform surrounded by said surface and said top substantially co-planar with said surface, means to rotate said platform about an axis perpendicular to said surface, and means to align the motor vehicle upon said platform in a location allowing said platform to rotate without the motor vehicle impacting said walls, said alignment means including a plurality of guidelights in said top of said platform, said guidelights arranged in a plurality of rows.

Viewed from a third vantage point, it is an object of the present invention to provide a method for rotating a motor vehicle including the steps of providing a platform with a center of rotation and including a top which can support a motor vehicle thereon, forming a chamber beneath the platform, orienting a motor having an output shaft within the chamber such that the output shaft is coaxial with the center of rotation of the platform, coupling the output shaft to the center of rotation of the platform, supporting the platform vertically upon wheels connected in a plurality of circular patterns concentric with the center of rotation to a bottom thereof and supported upon a plurality of circular races, supporting the platform horizontally by the steps of: nesting the platform within a cylindrical sidewall, and connecting wheels to the platform oriented to roll upon the side wall, driving a motor vehicle onto the platform, and activating the motor, causing the motor to turn the platform and motor vehicle about the center of rotation.

These and other objects will be made manifest when considering the following detailed specification when taken in conjunction with the appended drawing figures.

DESCRIPTION OF PREFERRED EMBODIMENTS

Referring to the drawings, wherein like reference numerals represent like parts throughout the various drawing figures, reference numeral 10 is directed to a rotating floor for motor vehicles. The rotating floor 10 provides a platform 20 (FIG. 1) nested within an opening O in a surface D adjacent a structure S. The platform 20 is operatively coupled to a drive system 100 which rotates the platform 20 along arrow A about a vertical axis V passing through a center 24 of the platform 20, thus rotating a motor vehicle supported thereon.

In essence, the rotating floor 10 includes the platform 20 supported upon an outer race 40 (FIG. 3) and an inner race 45 through outer wheels 60 (FIGS. 1 and 2) and inner wheels 70, respectively. The races 40, 45 are positioned within the opening O of the surface D such that a top surface 21 of the platform 20 is substantially coplanar with the surface D. The center 24 of the platform 20 is coupled to the drive system 100. The drive system 100 is located beneath the platform 20 and includes a motor 120 with an output shaft 122 coaxial with the center 24 and coupled to the center 24 through a drive shaft 130.

The motor 120 and drive shaft 130 are surrounded by a tower 110. The tower 110 includes a plateau 116 at an upper portion thereof which supports the platform 20 near the center 24. A manhole 31 with manhole cover 32 is provided in the platform 20 to allow a user U to enter a chamber 30 which houses the drive system 100. The chamber 30 includes a tunnel 34 allowing the user U to access the inner race 45 and outer race 40 for maintenance of the races 40, 45 and wheels 60, 70.

Side wheels 50 are oriented adjacent a periphery 28 of the platform 20 which roll along a cylindrical sidewall F (FIGS. 2 and 3) of the opening O. A plurality of guide lights 172 oriented in rows 173 are positioned on the top surface 21 of the platform 20 to form a lane L for location of the motor vehicle thereon. Sensors 174 located in a wall W of the structure S monitor an alignment of the vehicle upon the platform 20. A trough 170 is positioned at a location at which wheels of the motor vehicle are desired to rest. Scale 160 is provided with input pads 164 (FIGS. 3 and 5) strategically located beneath wheels 60, 70 to gauge a weight of the motor vehicle when the motor vehicle is positioned upon the platform 20.

Figure 1:
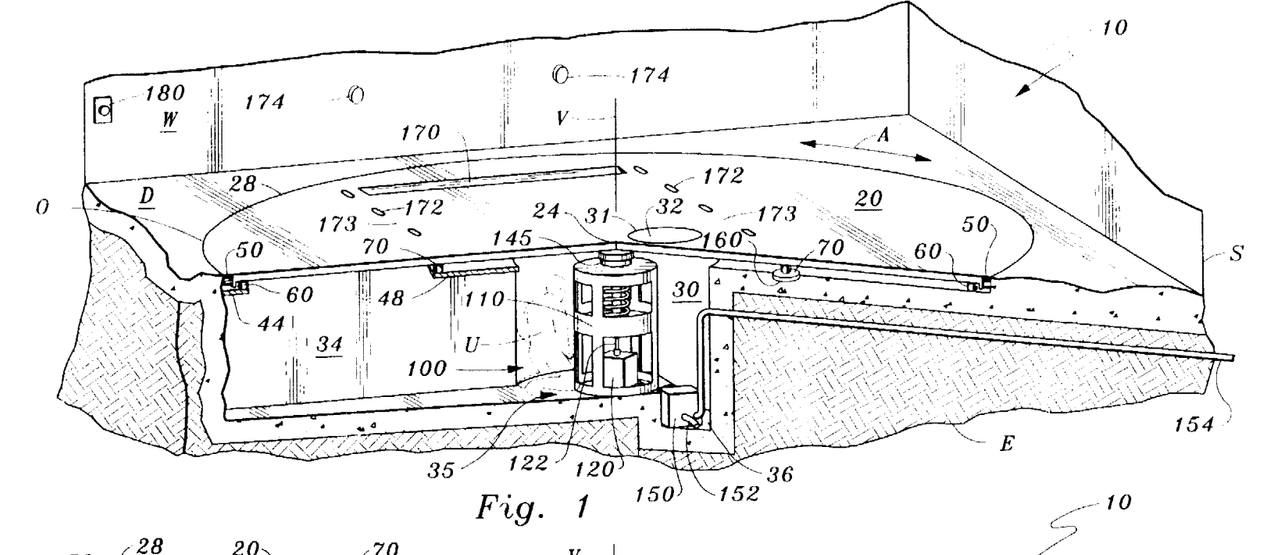
FIG. 1 is a perspective view of the device of this invention with portions thereof cut away to reveal interior and subterranean details thereof.
Figure 2:
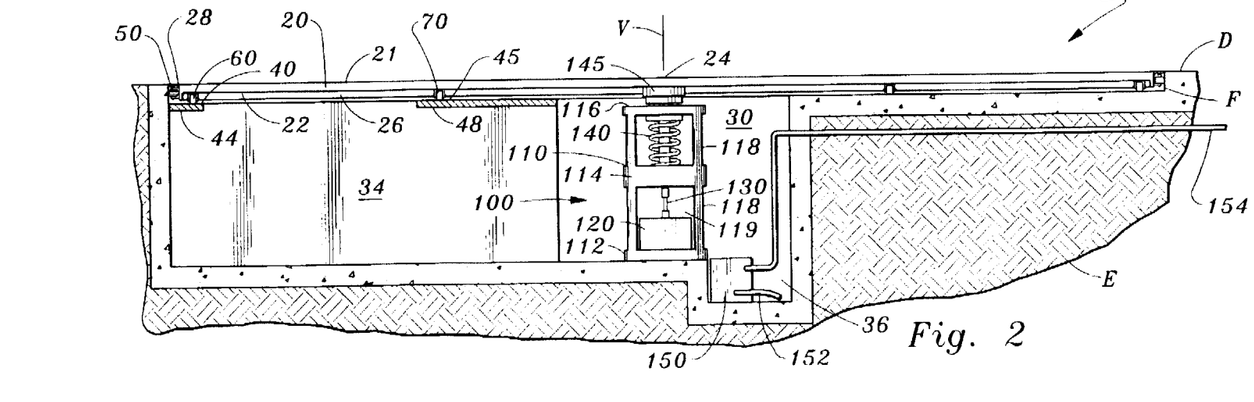
FIG. 2 is a full sectional view of that which is shown in FIG. 1.
Figure 3:
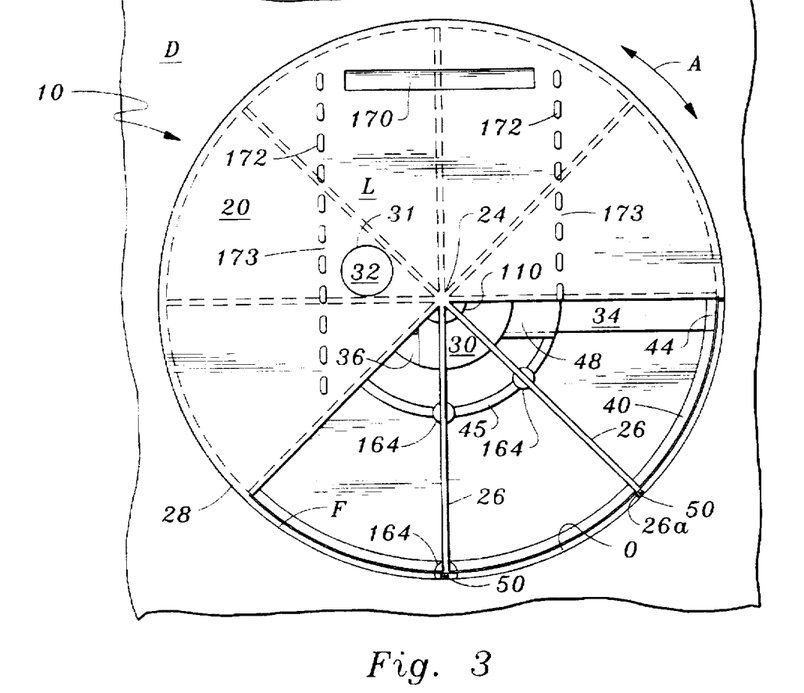
FIG. 3. is a top view of the device of this invention with portions thereof cut away to reveal interior details.
Figure 5:
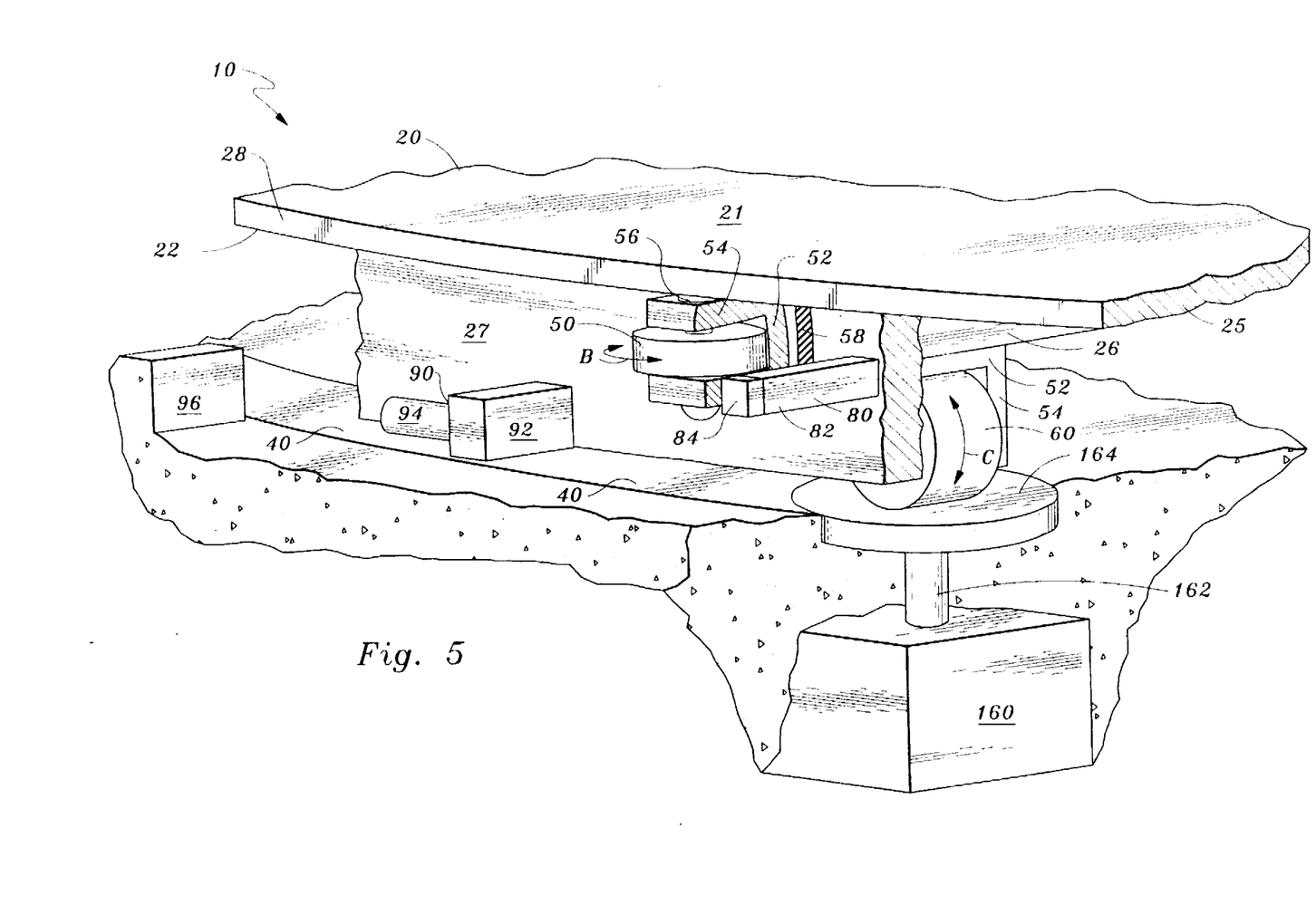
FIG. 5 is a perspective view of further details of that which is shown in FIG. 1.

More specifically, and with reference to FIGS. 1 through 3, details of the platform 20 are described. The platform 20 is a substantially circular disc-shaped structure including a top surface 21 and a bottom surface 22. A plurality of radial structural members 26 radiate outward from the center 24 of the platform 20 to a periphery 28 of the platform 20. The platform 20 has a thickness 25 (FIG. 5). The top surface 21 can support a motor vehicle thereon during utilization of the rotating floor 10. The radial structural members 26 provide added stiffness to the platform 20 so that when the platform 20 is loaded by a motor vehicle the platform 20 is inhibited from significant deflection. Preferably, the platform 20 is formed from a castable material such as portland cement and the radial structural members 26 are formed from a material having a high degree of stiffness such as steel "I"—Beams.

Figure 4:
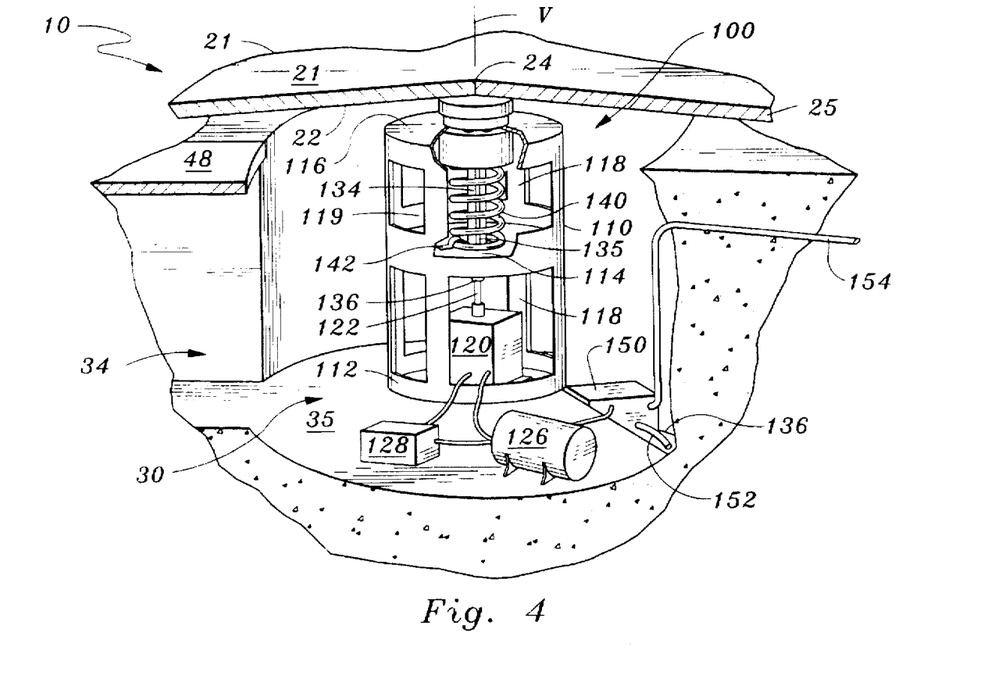
FIG. 4 is a perspective view of a portion of that which is shown in FIG. 1 with portions thereof cut away to reveal hidden details.

The platform 20 is caused to rotate by a drive system 100 located within a chamber 30 beneath the platform 20. The chamber 30 (FIGS. 1, 2 and 4) has sufficient volume to allow a human user U to enter the chamber 30 to effectively maintain the drive system 100. The chamber 30 is accessed through a manhole 31 formed through the platform 20. The manhole 31 includes a manhole cover 32 which occludes the manhole 31 and can support the weight of a motor vehicle thereon.

A user U enters the chamber 30 by removing the manhole cover 32 from the manhole 31 and climbing down through the manhole 31 and into the chamber 30. A recess 36 is formed at a floor 35 of the chamber 30. The recess 36 provides a lowermost portion of the floor 35 to which fluids in the chamber 30 can migrate and collect for drainage out of the chamber 30. The chamber 30 generally is cylindrical in shape with a radius less than a distance from the center 24 of the platform 20 to the inner wheels 70 supporting the platform 20.

A tunnel 34 extends radially away from the chamber 30 to a distance similar to a distance from the center 24 to the periphery 28 of the platform 20. The tunnel 34 is sized to allow the user U to pass therethrough. The tunnel 34 thus allows the user U to access various structures of the platform 20 on an underside thereof for maintenance. Rotation of the platform 20 causes substantially every structure attached to the bottom surface 22 of the platform 20 to be accessible from the tunnel 34 at some point.

The platform 20 is supported within the opening O in the surface D upon the outer race 40 and the inner race 45. Preferably, the races 40, 45 are formed of a material having strength such that when loaded by the platform 20, the races 40, 45 withstand a high compressive load. The races 40, 45 are essentially arranged as concentric circles surrounding the center 24 of the platform 20. An outer bridge 44 supports a portion of the outer race 40 passing over the tunnel 34. The outer bridge 44 thus allows the outer race 40 to be continuous along a pathway entirely surrounding the center 24. The inner race 45 includes an inner bridge 48 passing over the tunnel 34 which allows the inner race 45 to be continuous surrounding the center 24.

With reference to FIGS. 1 through 3 and 5, details of the wheels 50, 60, 70 are shown. The platform 20 includes the side wheels 50 to maintain an alignment of the platform 20 within the opening O of the surface D. The opening O includes a side wall F which is substantially cylindrical and vertical. The platform 20 is oriented in a horizontal fashion nested within the side wall F of the opening O. Thus, when a motor vehicle is driven onto the platform 20, a smooth transition is provided between the surface D and the top surface 21 of the platform 20.

The side wheels 50 extend radially away from the periphery 28 of the platform 20. The platform 20 includes a circumferential structural member 27 supporting the thickness 25 of the platform 20 at the periphery 28. The circumferential structural member 27 has the side wheels 50 attached thereto. Each side wheel 50 is preferably located in radial alignment adjacent a peripheral end 26A of a radial structural member 26. Each side wheel 50 is supported by a bracket 52 having two forks 54 with an axle 56 extending therebetween and with the side wheel 50 supported by the axle 56.

A buffer 58 is interposed between the bracket 52 and the circumferential structural member 27. The buffer 58 is formed of resilient material. The buffer 58 provides some resiliency to the side wheels 50 to assist in absorption of lateral forces exerted on the platform 20 and the side wall F. For instance, when a motor vehicle abruptly stops upon the platform 20, causing a momentum transfer to the platform 20, the buffer 58 absorbs some of this force. Also, the side wheels 50 are preferably formed from a resilient material such as rubber which additionally absorbs lateral forces between the platform 20 and the side wall F. The side wheels 50 are oriented to rotate freely along arrow A along the side wall F and about the substantially vertical axle 56. Thus, as the platform 20 is rotated along arrow A by the drive system 100, the side wheels 50 roll along the side wall F along arrow B.

A horizontal bumper 80 is preferably located adjacent each side wheel 50. Each horizontal bumper 80 includes a support 82 extending radially away from the circumferential structural member 27. A resilient member 84 is located at an end of the bumper 80 distant from the circumferential structural member 27. The bumper 80 extends from the member 27 a distance slightly less than a distance that the adjacent side wheel 50 extends from the member 27. The horizontal bumper 80 provides additional energy absorption for when horizontal momentum is transferred to the platform 20 from a motor vehicle.

A stop 90 is also supported by the circumferential structural member 27. The stop 90 includes a mount 92 fixedly attached to the circumferential structural member 27 and an energy absorber 94 coupled to the mount 92. The energy absorber 94 is positioned such that it can address an abutment 96 formed in the side wall F. Both the abutment 96 and the stop 90 are aligned below a path of the sidewheels 50 upon the side wall F so that the sidewheels 50 avoid the abutment 96. The stop 90 and abutment 96 prevent the platform 20 from rotating more than a desired amount. Preferably, the platform 20 rotates no more than 180°.

When the drive system 100 requires assistance in halting rotation of the platform 20 along arrow A beyond a desired amount, the stop 90 and abutment 96 are provided as a back-up system to prevent such over-rotation of the platform 20. For instance, the drive system 100 can be programmed to cease rotation of the platform 20 after approximately 170° of rotation. The platform 20 can then coast to a stop somewhere between 170° of rotation and 180° of rotation. Should the platform 20 have sufficient angular momentum to carry it beyond the 180° angular displacement, the stop 90 and abutment 96 coact to prevent such additional rotation.

Preferably, at least two rotational bumpers 90 are utilized on the platform. 20. One stop 90 would operate to halt rotation of the platform 20 in a clockwise direction and a second rotational bumper oriented in a manner opposite that shown by the stop 90 in FIG. 5 would halt rotation of the platform 20 in a counterclockwise direction. Strategic placement of these rotational bumpers 90 and abutments 96 will provide the platform 20 with the desired rotational operating range.

The outer wheels 60 are supported upon brackets 52 having forks 54 which support the outer wheels 60 in a manner similar to their support of the side wheels 50. However, the outer wheels 60 are coupled through the brackets 52 to portions of the radial structural members 26 adjacent the periphery 28 of the platform 20. The outer wheels 60 are aligned to roll along the outer race 40. Thus, the outer wheels 60 rotate along arrow C about a horizontal axis substantially parallel to a long axis of the radial structural members 26. Preferably, each radial structural member 26 includes an outer wheel 60 thereon. The wheels 60 together form a circle which is concentric with the center 24 of the platform 20.

With reference to FIGS. 1 through 3, the inner wheels 70 are supported and arranged in a manner similar to the support of the outer wheels 60. However, the inner wheels 70 are positioned near mid-points along the radial structural members 26 in an alignment allowing the inner wheels 70 to roll along the inner race 45. While the side wheels 50 provide primarily an alignment for the platform 20, the outer wheels 60 and inner wheels 70 provide support for the platform 20.

Referring now to FIGS. 1, 2, 4 and 6, details of the drive system 100 are described. The drive system 100 is located within the chamber 30 and is primarily surrounded by the tower 110. The tower 110 supports the drive system 100 and also portions of the platform 20 near the center 24. The tower 110 is a substantially cylindrical structure having a circular base 112, a mid-floor 114 and a plateau 116. The mid-floor 114 is oriented substantially halfway between the base 112 and, the plateau 116. The base 112 is supported on a floor 35 of the chamber 30. The plateau 116 is spaced slightly below the bottom surface 22 of the platform 20. A plurality of vertical supports 118 are oriented between the base 112 and the mid-floor 114 and between the mid-floor 114 and the plateau 116. A plurality of windows 119 are provided between the vertical supports 118. The windows 119 provide easy access for a user U for structures within the tower 110.

The motor 120 is supported upon the base 112 of the tower 110. The motor 120 is preferably a hydraulic motor having an output shaft 122 which rotates about arrow G (FIG. 6) when the motor 120 is activated. Preferably, the motor 120 provides a low speed, high torque rotation to the output shaft 122. The output shaft 122 extends substantially vertically along a line colinear with the center 24 of the platform 20.

The motor 120 preferably rests upon a pad 124 having resilient characteristics. For instance, the pad 124 can be formed from a rubber compound. The pad 124 isolates the tower 110 from vibration of the motor 120 and can absorb somewhat any vertical loads passing to the motor 120 through the output shaft 122. When the motor 120 is a hydraulic motor, a hydraulic reservoir 126 (FIG. 4) and a hydraulic pump 128 are provided to effectively operate the motor 120. Alternatively, the motor 120 can be an electric motor or any other motor having an appropriate output shaft 122.

The output shaft 122 is coupled to a drive shaft 130 interposed between the center 24 and the output shaft 122. The drive shaft 130 is preferably oriented coaxially with the output shaft 122 and the center 24. This arrangement facilitates direct connection of the output shaft 122 to the drive shaft 130 and the drive shaft 130 to the center 24. Thus, the motor provides "direct drive" to the platform 20. A shaft bearing 132 depends down from the plateau 116 of the tower 110 and aligns and supports the drive shaft 130 at a center of the tower 110 through a bearing collar 135. The plateau 116 and mid-floor 114 include openings 133 therein, allowing the drive shaft 130 to pass upward through the tower 110. A cylindrical sleeve 134 preferably surrounds the drive shaft 130 between the mid-floor 114 and the plateau 116. The sleeve 134 protects the drive shaft 130 from disruption. Preferably, holes 135 are located in the sleeve 134 to allow the user U to observe the drive shaft 130 when necessary.

The drive shaft 130 is coupled to the output shaft 122 through a flexible coupling 136. The flexible coupling 136 is essentially a shaft coupling which allows for slight axial displacement between the two shafts. Thus, the flexible coupling 136 allows the drive shaft 130 to translate vertically with respect to the output shaft 122 while still remaining coupled rotationally. One form of flexible coupling 136 is referred to as a Body-Spider-Body type and is manufactured under the name "Lovejoy". The Lovejoy flexible coupling provides a flexible spider which is sandwiched between two bodies rigidly connected on opposite sides of the flexible coupling 136. The flexible coupling 136 allows axial translation, but prohibits relative rotation between opposite sides of the coupling 136.

Alternatively, the lovejoy 136 may have sufficient flexibility to allow the drive shaft 130 to pivot slightly out of perfect axial alignment with the output shaft 122 and still remain rotationally coupled to the output shaft 122. Thus, the lovejoy 136 may be embodied as a "constant velocity joint" or "universal joint" characteristic. The lovejoy 136 allows the drive shaft 130 to be displaced slightly due to forces applied to the platform 20 by locating a motor vehicle thereon, without interrupting the rotational coupling between the output shaft 122 and the drive shaft 130. Also, any slight horizontal translation of the platform 20 caused by forces exerted on the platform 20 by the motor vehicle will not disrupt rotational coupling of the output shaft 122 to the drive shaft 130. The lovejoy 136 may be defined as both a splined shaft serially followed by a "U" joint.

A spring 140 is interposed between the mid-floor 114 and a lower surface 137 of the shaft bearing 132. Thus, the spring 140 is essentially interposed between the mid-floor 114 and the plateau 116. The spring 140 is provided with a sufficiently high spring constant that large forces are exerted by the spring 140 when the spring 140 is compressed slightly.

The spring 140 is preferably pre-compressed so that when no load is placed upon the plateau 116, the spring 140 exerts an upward force on the plateau 116. When the plateau 116 is loaded, the spring 140 is further compressed due to slight compression of the vertical supports 118 and deflection of the plateau 116. As the spring 140 is further compressed, a force exerted upwards on the plateau 116 by the spring 140 is increased. This additional force assists the plateau 116 in supporting vertical downward loads placed thereon. Also, the spring 140 provides additional resiliency to the tower 110. Preferably, the vertical supports 118 below the mid-floor 114 are stronger than the vertical supports 118 above the mid-floor 114 so that a lower end of the spring 140 is adequately supported. The spring 140 thus assists in supporting the plateau 116 without substantial displacement when loaded through the platform 20 by a motor vehicle, especially when the motor vehicle has a great mass or is moved rapidly onto or off of the platform 20. The spring 140 is supported in position surrounding the sleeve 134 by clamps 142.

Figure 6:
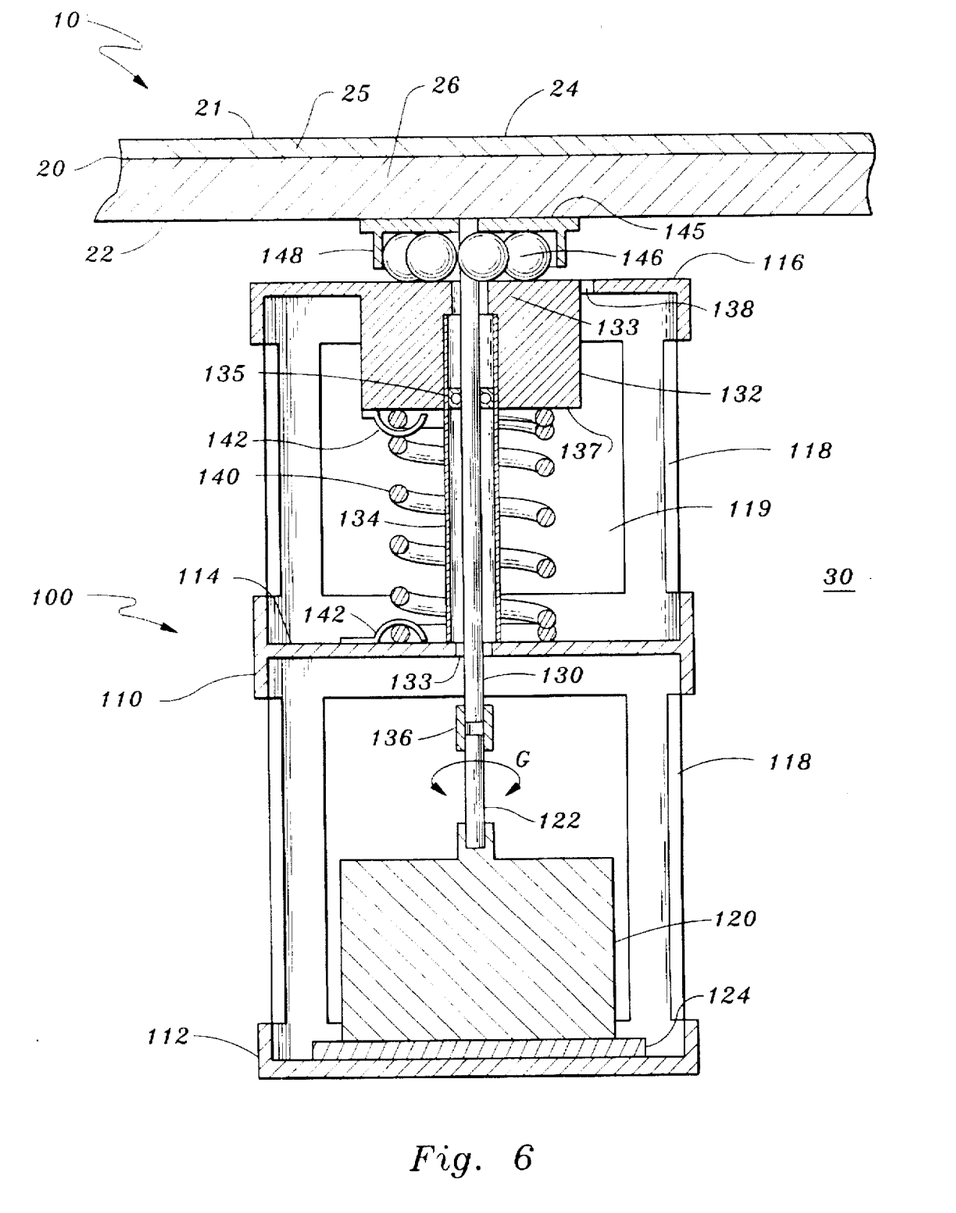
FIG. 6 is a sectional view of a portion of that which is shown in FIG. 1 revealing details of the drive system of this invention.

In an alternative embodiment, the shaft bearing 132 can be separated from the plateau 116, by a gap 138 (FIG. 6).

The shaft bearing 132 would thus be entirely supported vertically by the spring 140. The gap 138 surrounds the shaft bearing 132 and is sized to prevent substantial lateral movement of the shaft bearing 132 such as when a motor vehicle abruptly stops upon the platform 20.

A platform bearing 145 extends from the bottom surface 22 of the platform 20. The platform bearing 145 includes a cylindrical rim 148 depending downward therefrom toward the plateau 116. The platform bearing 145 is substantially radially symmetrical and aligned with a center thereof coaxial with the output shaft 122, drive shaft 130 and center 124 of the platform 20. A plurality of balls 146 are interposed between the platform bearing 145 and the plateau 116. The balls 146 are provided with a diameter greater than a height of the rim 148. Thus, the platform bearing 145 and associated balls 146 provide a roller bearing support for the portion of the platform 20 surrounding the center 24. The balls 146 allow for rotation of the platform 20 while still supporting the platform 20 near the drive shaft 130.

The recess 36 preferably includes a sump pump 150. The pump 150 (FIGS. 1, 2 and 4) is provided in a bottom of the recess 36 of the chamber 30. The pump 150 includes an inlet line 152 located within the recess 36 and an outlet line 154 extending out of the chamber 30 and communicating with a location distant from the rotating floor 10. The sump pump 150 is preferably powered by the hydraulic pump 128 and prevents liquid from collecting in the chamber 30. Thus, the drain pump 150 maintains the chamber 30 in a condition allowing a user U to conveniently enter therein. The drain pump 150 also prevents liquid from damaging the motor 120 and other portions of the drive system 100.

With reference to FIGS. 1, 3 and 5, details of a weighing system for motor vehicles upon the rotating floor 10 is described. The outer race 40 and inner race 45 preferably include a plurality of input pads 164 therein. The input pads 164 are substantially disk shaped constructs which are coplanar with the races 40, 45 and which support the outer wheels 60 and inner wheels 70 during a portion of wheel 60, 70 travel along the races 40, 45. Preferably, the pads 164 are located so that at least some of the outer wheels 60 and inner wheels 70 are located thereon when the platform 20 is oriented in a stationary manner either oriented to receive a motor vehicle thereon or for removal of a motor vehicle therefrom.

Each of the pads 164 is coupled to a piston 162 which interfaces with a scale 160. Each of the scales 160 monitors a displacement of the piston 162 and associated input pad 164 corresponding to a force which is applied downward upon the input pad 164. Through initialization and calibration techniques well known in the art, various forces applied to the scales 160 can be interpreted as corresponding to various different motor vehicle weights. In this way, a weight of a motor vehicle placed upon the platform 20 can be measured when desired.

For instance, the pads 164 can be located to support 25% of the wheels 60, 70 when the platform 20 is positioned as shown in FIG. 1. The pistons 162 and scales 160 can be selected to be deflected an amount similar to portions of the races 40, 45 when similarly loaded. When a motor vehicle is positioned on the platform 20, each of the scale readings can be added and divided by 0.25. This system can be calibrated by placing a vehicle of known weight onto the platform and appropriately adjusting a reading obtained from the scales 160 to reflect the appropriate weight. Multiple calibration tests with vehicles of differing sizes and weights can provide the weighing system with further improved accuracy.

With reference to FIGS. 1 and 3, details of an alignment system for effective alignment of a motor vehicle upon the platform 20 is described. For best results in operating the rotating floor 10, it is desirable that the motor vehicle be located near a preferred central location every time the rotating floor 10 is utilized. To facilitate such accurate placement of the motor vehicle upon the platform 20, a plurality of guide lights 172 are provided extending through the top surface 21 of the platform 20. Preferably, the guide lights 172 are oriented along two rows 173 defining two sides of a lane L through which the motor vehicle should be driven when being located upon the platform 20. The guide lights 172 could merely be reflectors for reflecting light from another source, be battery operated, or be powered somehow through an external power source. For instance, batteries could supply electric power to the guide lights 172 and the batteries could be recharged either through an electrical connection from a source of electric power to the platform 20 or be removed for recharging at a remote location.

A trough 170 formed as a semi-cylinder is located at an end of the lane L defining a location at which wheels of the motor vehicle, can reside. The trough 170 can thus assist in consistent accurate placement of the motor vehicle upon the platform 20. The trough 170 also prevents the motor vehicle from driving too far over the platform 20 and into contact with the wall W of the structure S and assists in preventing the motor vehicle from impacting the wall W during rotation of the motor vehicle upon the platform 20.

A plurality of position sensors 174 can be located on the wall W at an elevation which is not greater than a height of the motor vehicle to be placed upon the platform 20. The position sensors 174 can detect whether the motor vehicle is properly aligned upon the platform 20 and act as a disabling element preventing operation of the rotating floor 10 unless the motor vehicle is appropriately located upon the platform 20. Additionally, the position sensors 174 can be coupled to indicia readable by a driver of the motor vehicle indicating whether the motor vehicle is properly aligned upon the platform 20. For instance, if the scales 160 detect weight on the platform 20, but the sensors 174 fail to detect the motor vehicle as being properly aligned, a red light can be activated on the wall W for viewing by the driver of the motor vehicle. If the position sensors 174 detect that the motor vehicle is properly aligned, a green light can be illuminated.

In use and operation, the rotating floor 10 can be used in the following manner. Initially, the platform 20 is positioned with the trough 170 near the wall W (as shown in FIG. 1) and with the guide lights 172 oriented along rows 173 substantially perpendicular to the wall W. A motor vehicle is then driven along the surface D and onto the platform 20 between the rows 173 of guide lights 172 until front wheels of the motor vehicle enter the trough 170. The motor vehicle is then stopped. Next, the user U activates the motor 120, by toggling of a switch 180 mounted on the wall W (FIG. 1) and operatively coupled to the motor 120. Alternatively, a remote switch can be carried by the user U or mounted within a motor vehicle. The motor 120 causes the output shaft 122 to rotate about arrow G (FIG. 6), which causes the drive shaft 130 to rotate about arrow H (FIG. 6), causing the platform 20 to rotate about axis V and along arrow A (FIG. 1).

As the platform 20 rotates, the side wheels 50 maintain the platform 20 aligned within the opening O and the surface D. The inner wheels 70, outer wheels 60 and platform bearing 145 support the platform 20 during this rotation. The motor 120 is deactivated once the platform 20 has rotated sufficiently to re-orient the motor vehicle as desired. In an application such as a motor vehicle garage, typically 180° of rotation would be desired. In this instance, the motor 120 would be deactivated after the platform 20 had rotated approximately 180°. Should rotation beyond a desired limit occur, the stop 90 would impact the abutment 96, preventing further rotation of the platform 20.

Either before or after rotation of the platform 20, the outer wheels 60 and inner wheels 70 are preferably supported upon the input pads 164 of the weighing system. Thus, a reading of a weight of the motor vehicle can be obtained when the platform 20 is in the stopped position. When a driver wishes to remove the motor vehicle from the platform 20, the driver merely need drive the motor vehicle directly off of the platform 20, rotation of the platform 20 having altered a heading of the vehicle by 180°. After the motor vehicle has been driven off of the platform 20, the motor 120 should be activated, causing the platform 20 to rotate back to its original position.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A device for rotating a motor vehicle supported thereon, comprising in combination:

a substantially circular platform dimensioned to receive the motor vehicle thereon and having a rotational center point symmetrically disposed with respect to said platform, a motor having a rotational output shaft, and a drive shaft, said drive shaft directly coupled to said output shaft and said rotational center point of said platform along a line co-axial with said output shaft and said rotational center point, said drive shaft/output shaft direct coupling formed from a body—spider—body flexible coupling with said spider interposed between said drive shaft and said output shaft such that a substantially sleeve type overlying structure frictionally ensconces free ends of said drive shaft and said output shaft, whereby said platform is directly driven by said motor through said flexible coupling.

2. The device of claim 1 wherein said motor sits within an overlying tower and said tower extends adjacent an underside of said platform, said output and drive shaft centrally disposed within said tower, said tower including a plateau having an upper surface, ball bearings disposed between said plateau upper surface and an underside of said platform and supporting said platform on said plateau, said ball bearings surrounding said output shaft and constrained by an annular rim depending from said platform and circumscribing said ball bearings but providing a gap between said annular rim and said plateau, said tower further including a spring between said plateau and above said motor having means to absorb forces from said platform, and a resilient pad underlying said motor.

3. The device of claim 2 wherein a chamber is located below said platform, said platform including a manhole to allow a person to enter said chamber therethrough, said chamber supporting said motor therein underlying said platform, whereby said motor is exposed to said chamber to be accessed by a person for maintenance of said motor.

4. The device of claim 2 wherein a tubular shaft support is provided concentrically surrounding said drive shaft, said shaft support interposed between said tower's said plateau and a mid-floor, and a hole passing through said plateau and mid-floor and surrounding said drive shaft, such that the motor is oriented below said mid-floor and said drive shaft can pass through said plateau and is coupled to the center point of said platform.

5. The device of claim 4 wherein said spring overlies said drive shaft and is compressed between said mid-floor and an underside of said platform to absorb force from said platform.

6. The device of claim 5 wherein said chamber includes a tunnel extending radially horizontally away from said chamber for a distance similar to a distance from said rotational center point of said platform to a periphery of said platform, said tunnel having a size sufficient for a person to pass therethrough, whereby an undersurface of said platform can be entirely inspected by a person within the tunnel during rotation of said platform.

7. The device of claim 6 wherein said platform includes a plurality of wheels supported on an undersurface of said platform, said wheels oriented to rotate about axes substantially parallel to said platform, said wheels oriented to roll along a circular path equally distant from said center point of said platform, said wheels supported upon a circular race oriented equal distance from said center point of said platform, said race including a bridge supporting said race over said tunnel of said chamber, whereby said wheels can roll on said race even when said wheels are proximate to said tunnel.

8. The device of claim 7 wherein said manhole includes a cover which replaceably occludes said manhole, said manhole located a distance from said center point of said platform above said chamber and away from said line coaxial with said output shaft and said rotational center point, such that a person can access said chamber through said manhole regardless of any orientation of said platform.

9. The device of claim 8 wherein said periphery of said platform includes peripheral wheels oriented thereon having rotational axes substantially parallel to said line coaxial with said output shaft and said rotational center point, said peripheral wheels extending a distance from said rotational center point similar to a distance from said rotational center point to a cylindrical side wall within which said platform is nested, said platform oriented in a circular peripheral configuration, and a plurality of bumpers formed of resilient material connected to a periphery of said platform and oriented a distance from said center point slightly less than a distance from said rotational center point to said cylindrical side wall, whereby when said platform is displaced laterally said bumper impacts said side wall cushioning the platform and re-centering said platform over said motor and said drive shaft.

10. The device of claim 9 wherein a resilient buffer is interposed between a support bracket which carries said peripheral wheels and its attachment to said periphery of said platform so as to absorb radial forces from said platform and a resilient stop is interposed between said platform and a stationary abutment to limit platform movement.

11. The device of claim 10 wherein said top of said platform includes a plurality of lights thereon oriented in a plurality of rows, and wherein said top of said platform includes a trough therein at a location at which certain wheels of a motor vehicle should be located for proper support of said motor vehicle upon said platform.

12. The device of claim 11 wherein said chamber includes a pump therein, said pump having an inlet for receiving fluids therein and an outlet for discharging fluids therefrom, said outlet oriented outside of said chamber, whereby any liquids connecting within said chamber are removed from said chamber by said pump, and wherein said motor has means for being hydraulically driven.

13. A motor vehicle housing structure comprising in combination:

a horizontal surface, walls surrounding and extending upward from said surface, a platform having a top sized to support a motor vehicle thereon, said platform surrounded by said surface and said top substantially co-planar with said surface, said platform overlying a chamber which includes drive means therein and said platform including a manhole passing through said platform allowing access by a human to enter entirely into said chamber, means to rotate said platform about an axis perpendicular to said surface including a motor flexibly connected to an underside of said platform via a flexible coupling and a spring compressed between said platform and a support surrounding said motor to absorb weight transmitted from said platform, and p1 means to align the motor vehicle upon said platform in a location allowing said platform to rotate without the motor vehicle impacting said walls, said alignment means including a plurality of guide lights in said top of said platform, said guide lights arranged in a plurality of rows, and further including a bearing interposed between said platform and said spring, a resilient pad under said motor, said motor, spring and shaft supported within a tower having open access windows, said tower supporting a sleeve surrounding an upper portion of said drive shaft, and resilient absorption pads located between said platform and said surface to dampen shock therebetween.

14. The structure of claim 13 wherein said walls include sensors thereon detecting an orientation of said motor vehicle upon said platform, said sensors communicating with a means to indicate to a user information as to the position of the motor vehicle upon said platform.

15. The structure of claim 14 wherein said platform is partially supported upon pads operatively coupled to a means to weigh force applied to said pads, said weighing means including means to compare readings from multiple said pads to identify a weight of items placed upon said platform.

16. The structure of claim 15 wherein said top of said platform includes at least one trough therein, said trough positioned at a location at which wheels of the motor vehicle are desired for rotation of said platform without said motor vehicle impacting said walls of said structure.

17. The structure of claim 16 wherein said chamber includes a tunnel which extends from said access to a periphery of said platform, whereby portions of a bottom of said platform can be inspected by a person within said tunnel.

18. The structure of claim 17 wherein said platform includes a plurality of wheels oriented in concentric circles concentric with said axis, said wheels oriented to role along lines concentric with said axis, said wheels supported upon races oriented in a circular fashion concentric with said axis and completely surrounding said axis, said races supported upon bridges interposed between said races and said tunnel, whereby said races are supported in a manner overlying said tunnel.

19. A method for rotating a motor vehicle including the steps of:

providing a platform with a center of rotation and including a top which can support a motor vehicle thereon, forming a chamber beneath the platform including an access portal passing through the platform to access the chamber, orienting a motor in the chamber and within a support tower provided with access windows and having an output shaft within the chamber such that the output shaft is coaxial with the center of rotation of the platform and such that the motor and the shaft are openly accessible within the chamber through the windows, coupling the output shaft to the center of rotation of the platform, supporting the platform vertically upon wheels connected in a plurality of circular patterns concentric with the center of rotation to a bottom thereof and supported upon a plurality of circular races, supporting the platform horizontally by the steps of:
nesting the platform within a cylindrical sidewall, and
connecting wheels to the platform oriented to roll upon the side wall, driving a motor vehicle onto the platform, and activating the motor, causing the motor to turn the platform and motor vehicle about the center of rotation.

* * * * *